UNITED STATES PATENT OFFICE.

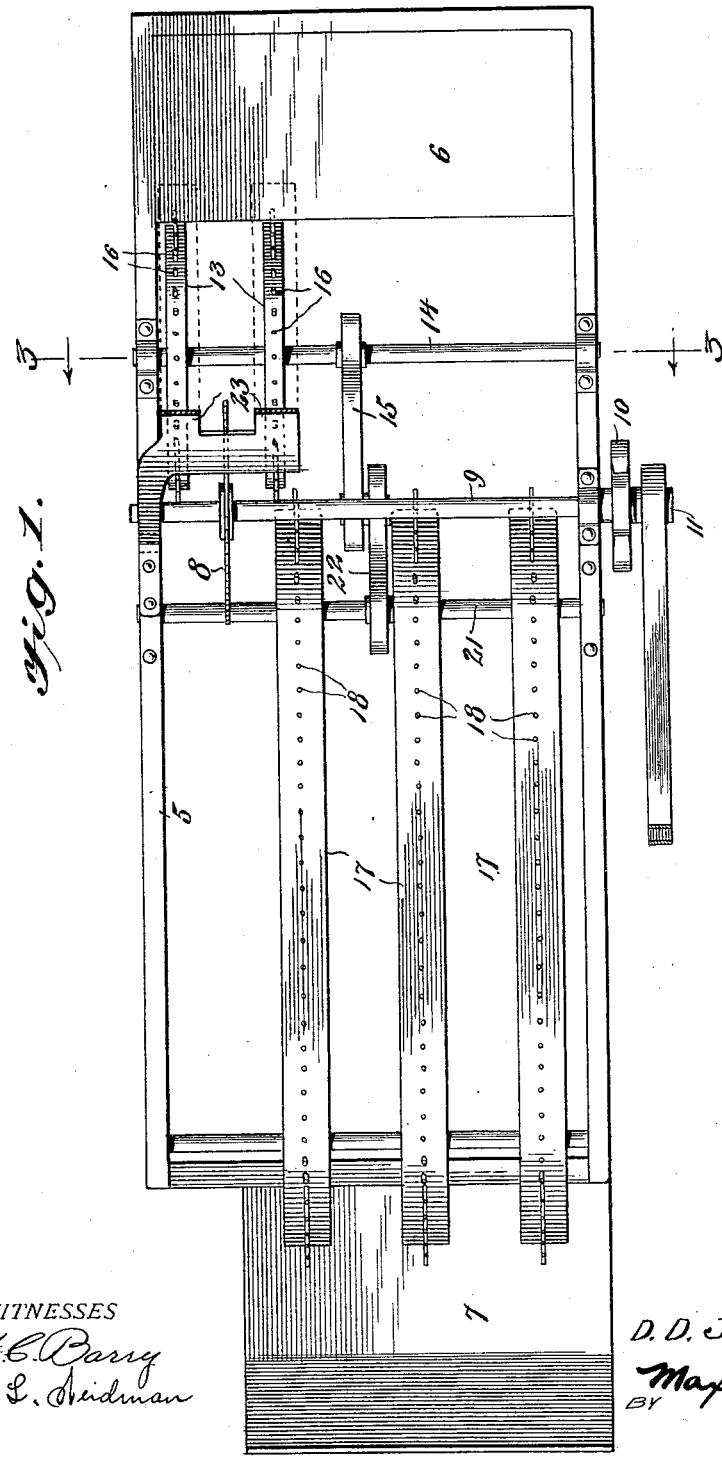

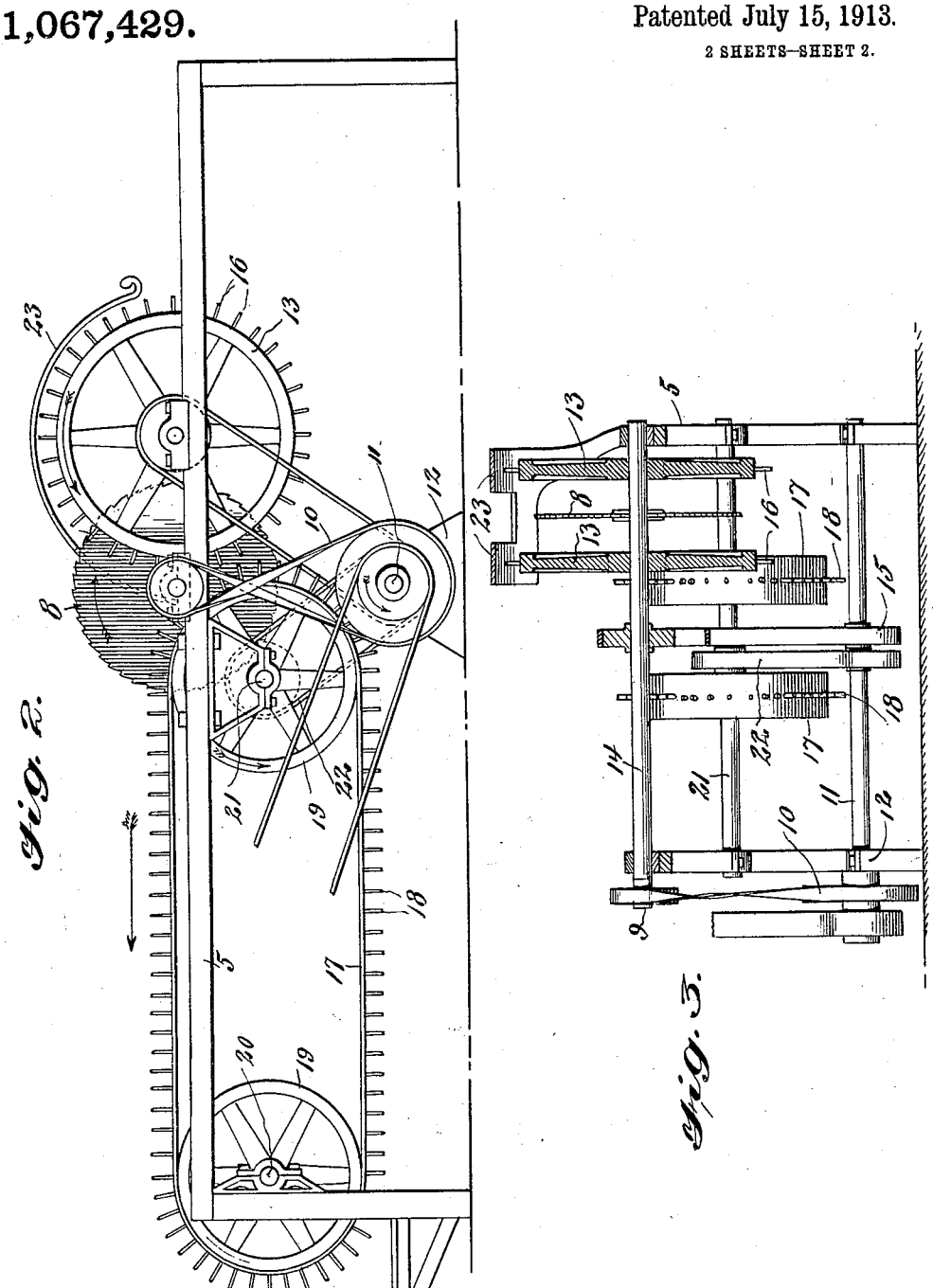

DAN DAVID JACKSON, OF SHAWNEE, OKLAHOMA.

STALK-CUTTER.

1,067,429.  Specification of Letters Patent.  Patented July 15, 1913.

Application filed November 14, 1912. Serial No. 731,299.

*To all whom it may concern:*

Be it known that I, DAN D. JACKSON, a citizen of the United States, residing at Shawnee, in the county of Pottawatomie and State of Oklahoma, have invented certain new and useful Improvements in Stalk-Cutters, of which the following is a specification.

This invention relates to machines for cutting stalks, and more particularly for cutting the stock or butts of broom corn from that portion of the stalk which is termed the hurl.

It is the object of the invention to provide an efficient and reliable machine of the kind stated, and also one which can be easily and cheaply built, and which is simple in construction and devoid of complicated parts liable to get out of order. These objects are attained by a novel combination and arrangement of parts to be hereinafter described and claimed, reference being had to the accompanying drawings in which—

Figure 1 is a plan view of the machine with parts broken away; Fig. 2 is a side elevation thereof, and Fig. 3 is a cross-section on the line 3—3 of Fig. 1.

Referring specifically to the drawings, 5 denotes the supporting frame of the machine, the same carrying at one end a feed table 6 from which the stalks to be cut are fed to the cutting mechanism. At the other end of the frame is mounted a rack 7 in which the hurls are deposited.

The cutter is a circular saw 8 which is mounted, adjacent to one side of the frame 5, on a transverse shaft 9 supported in suitable bearings on the frame, and having a pulley which is connected by a crossed belt 10 to a pulley on a drive shaft 11 supported in bearings 12 on the frame. The drive shaft 11 is belted or otherwise connected to a suitable source of power. The saw 8 works between two rotatable stalk carriers 13 mounted on a transverse shaft 14 supported in bearings on the frame 5. On the shaft 14 is a pulley which is connected by a belt 15 to a pulley on the drive shaft 11, whereby the motion of the latter shaft is transmitted to the carriers. Each stalk carrier comprises a wheel or disk having its periphery armed with radially projecting fingers 16.

The hurls are carried to the rack 7 by an endless conveyer comprising a series of belts 17 arranged side by side and traveling rearward in the direction of the rack. The belts are armed with projecting fingers 18, and they pass over pulleys or rollers 19. The pulleys at one end of the conveyer are mounted on a transverse shaft 20 supported in bearings on the frame 5, and the pulleys at the other end of the conveyer are mounted on a transverse shaft 21, also supported in bearings on the frame 5, and having a pulley which is connected by a belt 22 to a pulley on the drive shaft 11, whereby motion is transmitted from said shaft to the conveyer. It will be noted that one of the outside belts 17 of the series extends at its forward or receiving end alongside the saw 8 and is directly behind the carrier 13 on that side of the saw and in close proximity thereto, so that the hurls, after they are cut off by the saw, are taken off said carrier by the belt and swung onto the other belts and are then carried rearward and deposited in the rack 7.

Above the carriers 13, concentric thereto, are located spring guard-fingers 23 which are spaced therefrom a sufficient distance to permit the stalks to pass. The guard-fingers are fastened at one end to the frame 5, behind the carriers, and their free ends terminate in front thereof in close proximity to the feed table 6.

In operation, the stalks are pushed off the feed table 6 onto the carriers 13, which latter travel in the direction of the saw 8. When the stalks reach the saw, the hurls are cut off and carried to the rack 7 by the conveyer belts 17.

I claim:

A stalk cutting machine comprising a supporting frame, a feed table carried thereby, a pair of rotary stalk carriers behind the feed table, each carrier comprising a wheel or disk having its periphery armed with radially projecting fingers, a rotary cutter extending between said wheels or disks, an endless conveyer having its receiving end located behind one of the wheels or disks in close proximity thereto, and spring guard-fingers extending above the wheels or disks from the rear thereof and having their free ends terminating in close proximity to the top of the feed table at the rear end thereof.

In testimony whereof I affix my signature in presence of two witnesses.

DAN DAVID JACKSON.

Witnesses:
LEE E. WYMAN,
JOHN T. JACKSON.

Copies of this patent may be obtained for five cents each, by addressing the "Commissioner of Patents, Washington, D. C."